(12) United States Patent
Chou

(10) Patent No.: US 6,783,236 B2
(45) Date of Patent: Aug. 31, 2004

(54) FOLDABLE GLASSES

(76) Inventor: Pin Chou, 6 Industrial Fitfh Road, Tou Chiau Industrial Park, Chiayi 621 (TW)

( * ) Notice: Subject to any disclaimer, the term of this patent is extended or adjusted under 35 U.S.C. 154(b) by 0 days.

(21) Appl. No.: 10/419,316

(22) Filed: Apr. 19, 2003

(65) Prior Publication Data

US 2004/0141148 A1 Jul. 22, 2004

(30) Foreign Application Priority Data

Jan. 22, 2003 (TW) ...................................... 92201137 U
Feb. 14, 2003 (CN) ...................................... 03203199 U

(51) Int. Cl.[7] .............................................. G02C 5/08
(52) U.S. Cl. ............................................. 351/63; 2/454
(58) Field of Search ................................ 351/63; 2/454

(56) References Cited

U.S. PATENT DOCUMENTS

| | | | |
|---|---|---|---|
| 4,681,410 A | 7/1987 | Paulsen | 351/63 |
| 4,887,895 A | 12/1989 | Tzeng | 351/63 |
| 4,887,896 A | 12/1989 | Akagi | 351/63 |
| 5,028,126 A | 7/1991 | Takeuchi | 351/63 |
| 5,208,616 A | 5/1993 | Chang | 351/63 |
| 5,448,317 A | 9/1995 | Huang | 351/63 |
| 5,532,766 A | 7/1996 | Mateer et al. | 351/63 |
| 5,576,776 A | 11/1996 | Scheller | 351/63 |
| 5,896,185 A | 4/1999 | Huang | 351/63 |
| 5,929,966 A | 7/1999 | Conner | 351/118 |
| 6,017,119 A | 1/2000 | Huang | 351/63 |
| 6,048,062 A | 4/2000 | Chow | 351/63 |
| 6,102,541 A * | 8/2000 | Kuo | 351/63 |
| 6,158,860 A | 12/2000 | Huang | 351/136 |
| 6,315,408 B1 | 11/2001 | Huang | 351/128 |
| 6,409,335 B1 * | 6/2002 | Lipawsky | 351/63 |
| 6,447,116 B1 | 9/2002 | Chao | 351/63 |
| 6,530,660 B1 | 3/2003 | Chao et al. | 351/63 |

FOREIGN PATENT DOCUMENTS

| | | |
|---|---|---|
| JP | 2000-180798 | 6/2000 |
| JP | 2000-292751 | 10/2000 |
| JP | 2001-066555 | 3/2001 |
| JP | 2000-006264 | 1/2002 |

* cited by examiner

*Primary Examiner*—Huy Mai

(57) ABSTRACT

A pair of foldable glasses includes two lenses. Each lens has a first side and a second side, with the first side facing an eye when the glasses are worn, and the second side being opposite to the first side. In one approach, the lenses are connected together by a folding mechanism whereby the lenses can be folded with the first sides of both lenses facing each other. Each temple has a front section and a rear section that can be folded or retracted into the front section. This allows the temples to be in an extended or a shortened configuration. Each lens is connected or coupled to a temple by a pivoting joint, which allows the corresponding temple to be rotated from being perpendicular to being parallel to the lenses, and to be rotated from being extended rearward to being extended forward from the lenses.

14 Claims, 10 Drawing Sheets

FOLDABLE GLASSES

BACKGROUND OF THE INVENTION

1. Field of the Invention

The present invention relates generally to a glasses, and more particularly to a foldable glasses.

2. Description of the Related Art

Foldable glasses are glasses that can be folded so as to reduce their sizes for carrying or storing. They are popular to consumers. However, conventional foldable glasses have rooms for improvement. In U.S. Pat. No. 5,532,766, the lenses of a pair of foldable glasses can be folded away from the user's face based on a folding means at the bridge of the glasses. When in use, the lenses can move away from the user's face, while the bridge remains substantially anchored to his nose. Such misalignment can create discomfort to the user. Also, the bridge portion of the frame might be bent by unexpected force, which can hurt the user. So, typically, such glasses include a securing device to prevent the bridge portion of the frame from being bent by accident or by use. Such a structure typically increases the cost of the glasses. In U.S. Pat. No. 6,017,119, the lenses fold in towards the face. But in the folded position, the lenses of such glasses are exposed and can be scratched. In U.S. Pat. No. 6,447,116, the temples protect the lenses when the glasses are in a folded position. However, the temples are in a special structure—thicker at their front section and thinner at their rear section. Typical consumers may not be accustomed to such a different temple structure.

SUMMARY OF THE INVENTION

According to one embodiment of the present invention, a pair of foldable glasses comprises two lenses, which are coupled together by a folding mechanism. Each lens has a first side, and a second side that is opposite to the first side. When the glasses are in use or are being worn by a user, the first sides face the eyes of the user. When folded, the first sides face each other. Each temple of the glasses has a front section, and a rear section that can be folded or retracted into the front section. This allows the temple to be in extended or shortened configurations. Also, each temple is pivoted by a pivoting joint to allow the temple to be rotated from being perpendicular to being parallel to the lens, and to be rotated from being extended rearward to being extended forward from the lens. In one approach to fold the glasses, the temples are rotated from the rearward to the forward positions of the lenses. Then the temples are shortened, with their rear sections retracted into their corresponding front sections. After the temples are shortened, they are folded parallel to the lenses. Finally, the lenses are folded with their first sides facing each other so that the glasses are in the folded position.

Other aspects and advantages of the present invention will become apparent from the following detailed description, which, when taken in conjunction with the accompanying drawings, illustrates by way of example the principles of the invention.

Same numerals in FIGS. 1–14 are assigned to similar elements in all the figures. Embodiments of the invention are discussed below with reference to FIGS. 1–14. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
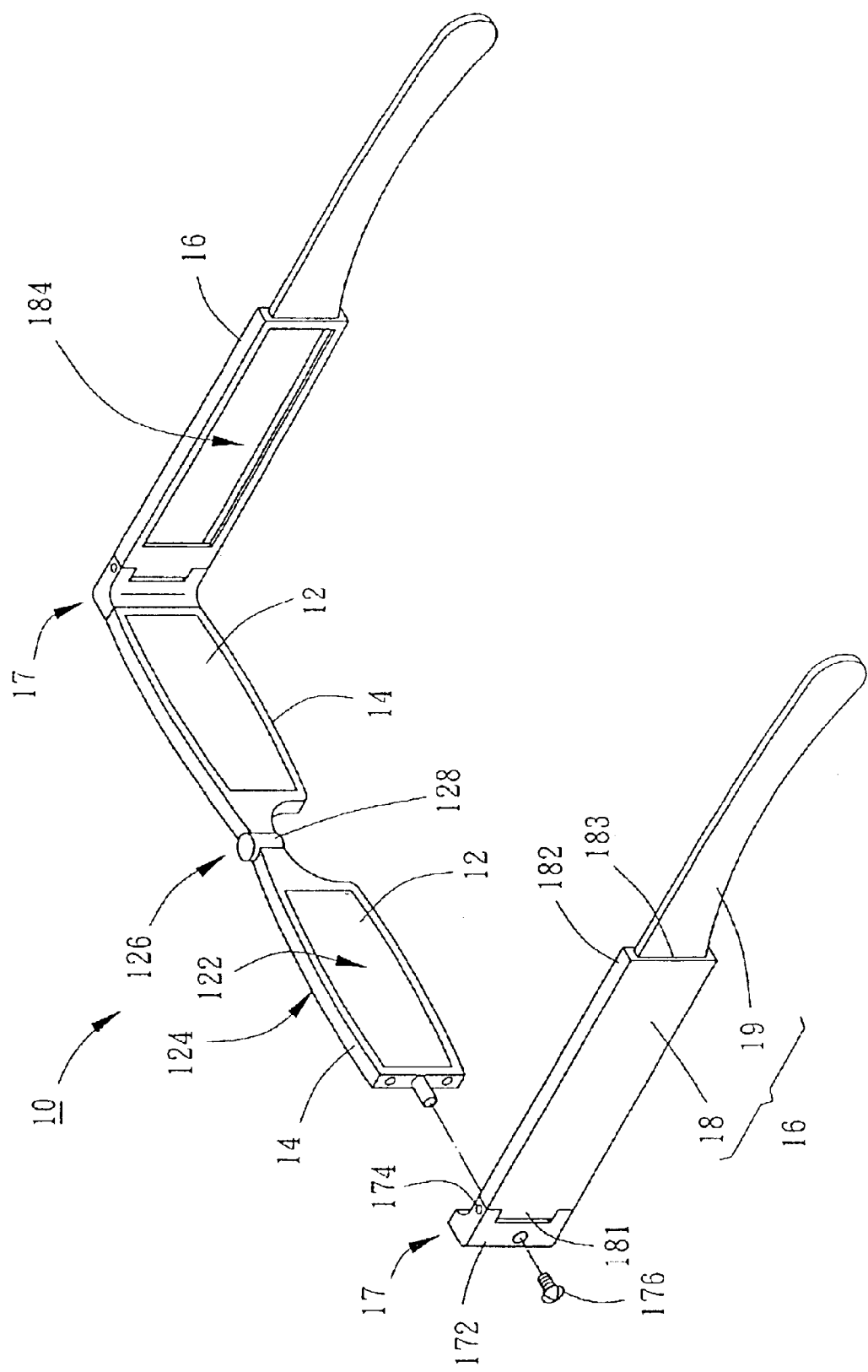
FIGS. 1–5 are different perspective views of a first embodiment of the present invention in a number of configurations.

FIG. 1 shows a perspective view of a pair of foldable glasses 10 of the first embodiment of the present invention. The glasses 10 comprises two lenses 12, two rims 14 where the lenses 12 are mounted, and two temples 16 extended rearwards from outer sides of the rims 14 respectively.

When in use or when the glasses are worn, each of the lenses 12 has a first side 122 facing an eye, and a second side 124 opposite to the first side 122. The lenses 12 are connected by a folding mechanism 126, which has a hinge 128 where the lenses 12 can be pivoted. To fold the glasses, the folding mechanism 126 permits the lenses to be folded inwards in the direction of the eyes, with their first sides 122 facing each other. So the hinge 128 normally moves away from the user's face when the glasses 10 are exerted by unexpected force. This tends to reduce the chance of hurting the user.

In normal use, the two temples 16 extend rearwards from the outer sides of the rims 14 respectively. Each temple has a front section 18 and a rear section 19. The front section 18 has a front end 181 that is connected to and pivoted on the rim 14 by a pivoting mechanism or a pivoting joint 17. The rear section 19 is connected to the front section 18, and can be folded or retracted into the front section 18.

Each of the pivoting mechanism 17 has a base member 172, a first hinge 174 pivoting the front section 18 of the temple 16 on the base member 172. The pivoting mechanism 17 also has a second hinge 176 pivoting the base member 172 on the rim 14. The orientation of the first hinge 174 is substantially perpendicular to the orientation of the second hinge 176. This structure allows the front sections 18 of the temples 16 to be turned toward or away from the lenses 12 along the first hinge 174. The front sections 18 of the temples 16 also can be turned about 180 degrees along the second hinge 176 so that the temples 16 can be extended either rearwards or forwards from the lenses.

The front sections 18 of the temples 16 can be a tube-like element and have a chamber or cavity 184 with an opening 183 at a rear end. The rear section 19 can be slidably received in the chamber 184, or extended rearwards out of the chamber 184. The front section 18 can have an opening at an interior side thereof, as shown in FIG. 1, to reduce its weight.

Figure 2:
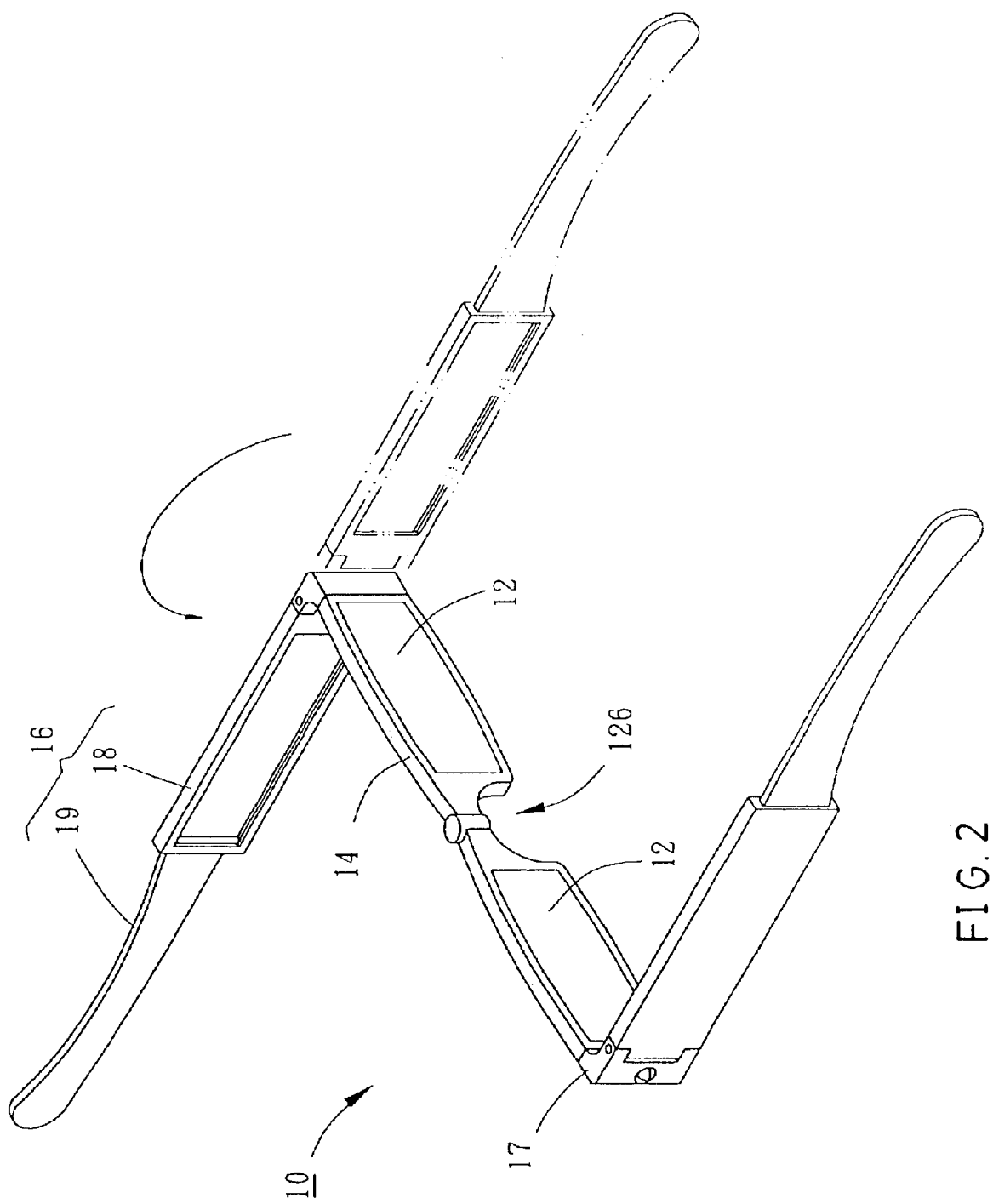
Figure 3:
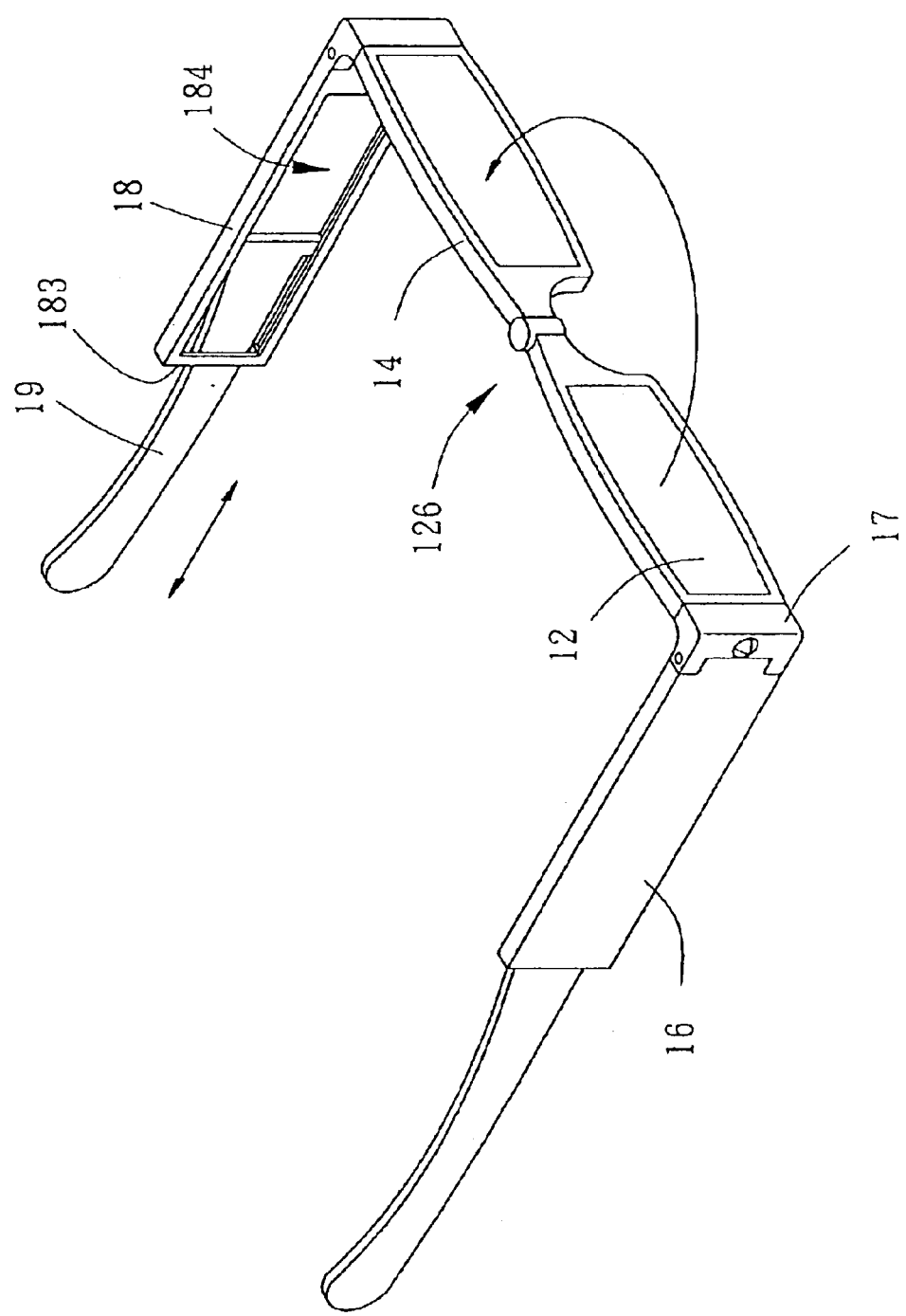
Figure 4:
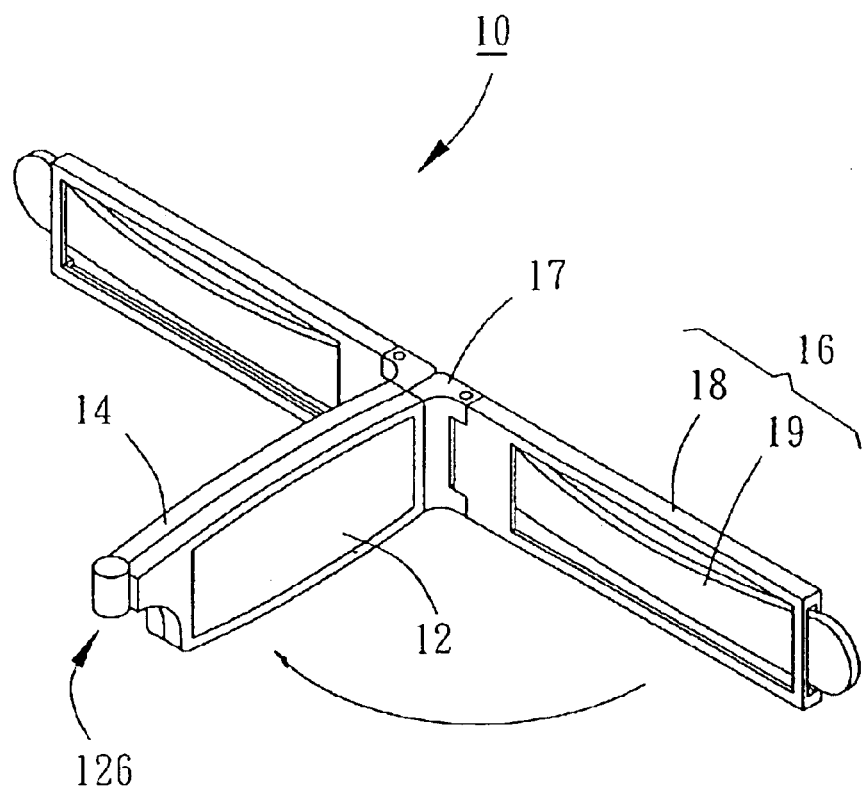
Figure 5:
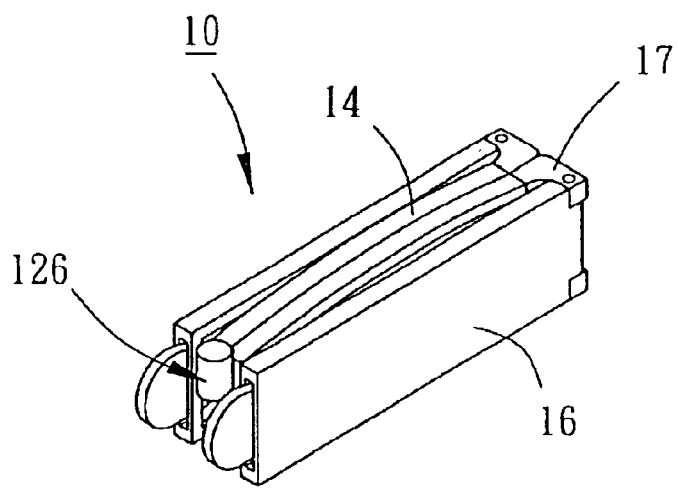

In one approach, to fold the glasses 10, first, turn the temples 16 about 180 degrees along the second hinge 176 of the pivoting mechanism 17 so that the temples 16 are extended forwards. One such temple is shown in FIG. 2. Second, push the rear sections 19 into the chambers 184 of the front sections 18 respectively. One such temple is shown in FIG. 3. Third, fold the lenses 12 via the folding mechanism 126, whereby the first sides 122 of the lenses 12 face each other as shown in FIG. 4. Fourth, turn the temples 16 along the first hinge 174 of the pivoting mechanism 17 so that the temples 16 are parallel to the lenses 12. The glasses 10 are then folded as shown in FIG. 5, with the lenses 12 protected by the temples 16 to prevent them from being damaged or scratched. The steps can be of different order. For example, the first step and the second step can be switched, and the third step and the fourth step can be switched.

The present invention can be applied to any type of glasses, such as glasses with full rims (as described above), glasses with half rims, glasses without rims or mask type glasses. Different embodiments of the folding mechanism, pivoting mechanism, and the front and rear section of the temples would be described in the following.

Figure 6:
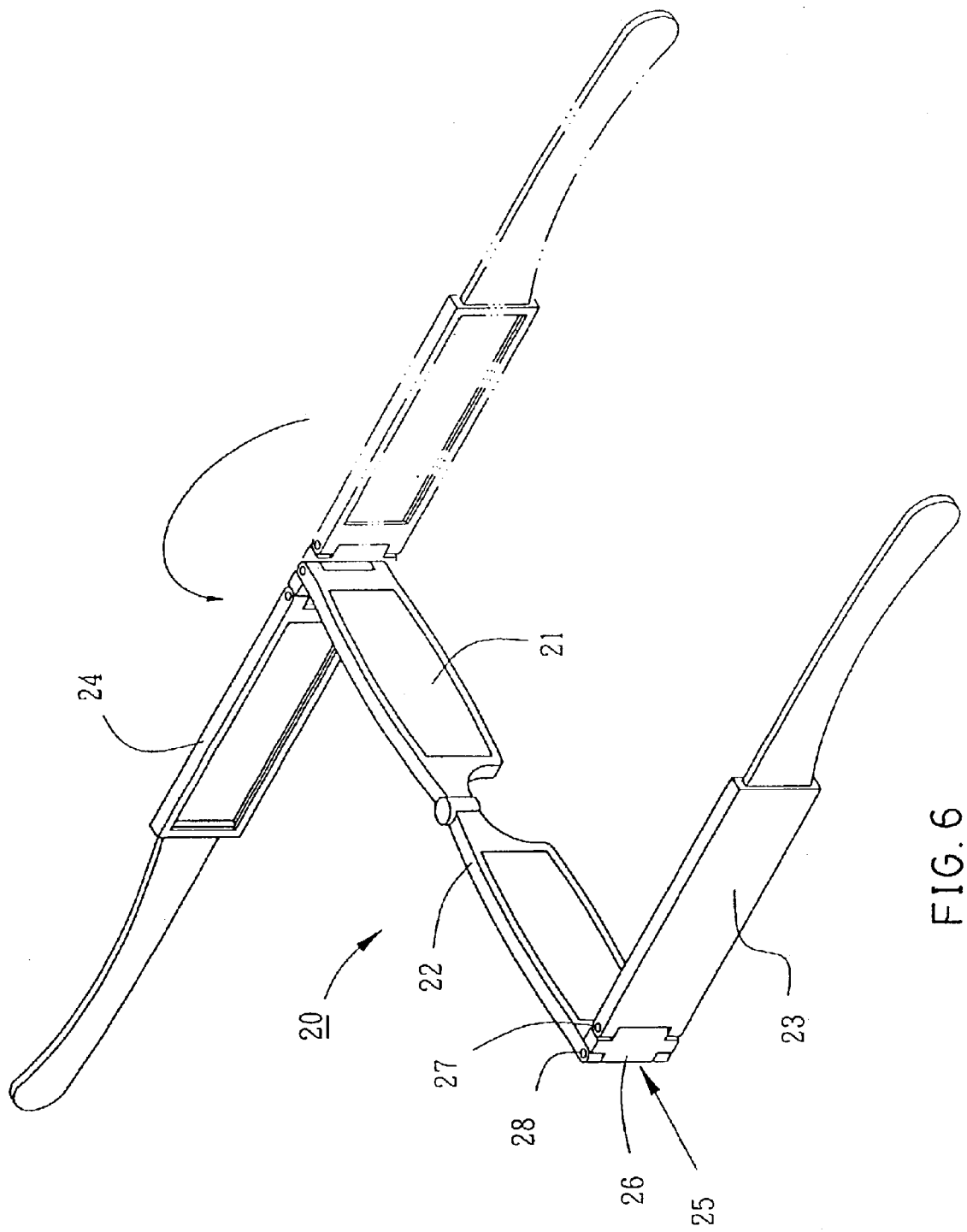
FIGS. 6–7 are different perspective views of a second embodiment of the present invention in a number of configurations.
Figure 7:
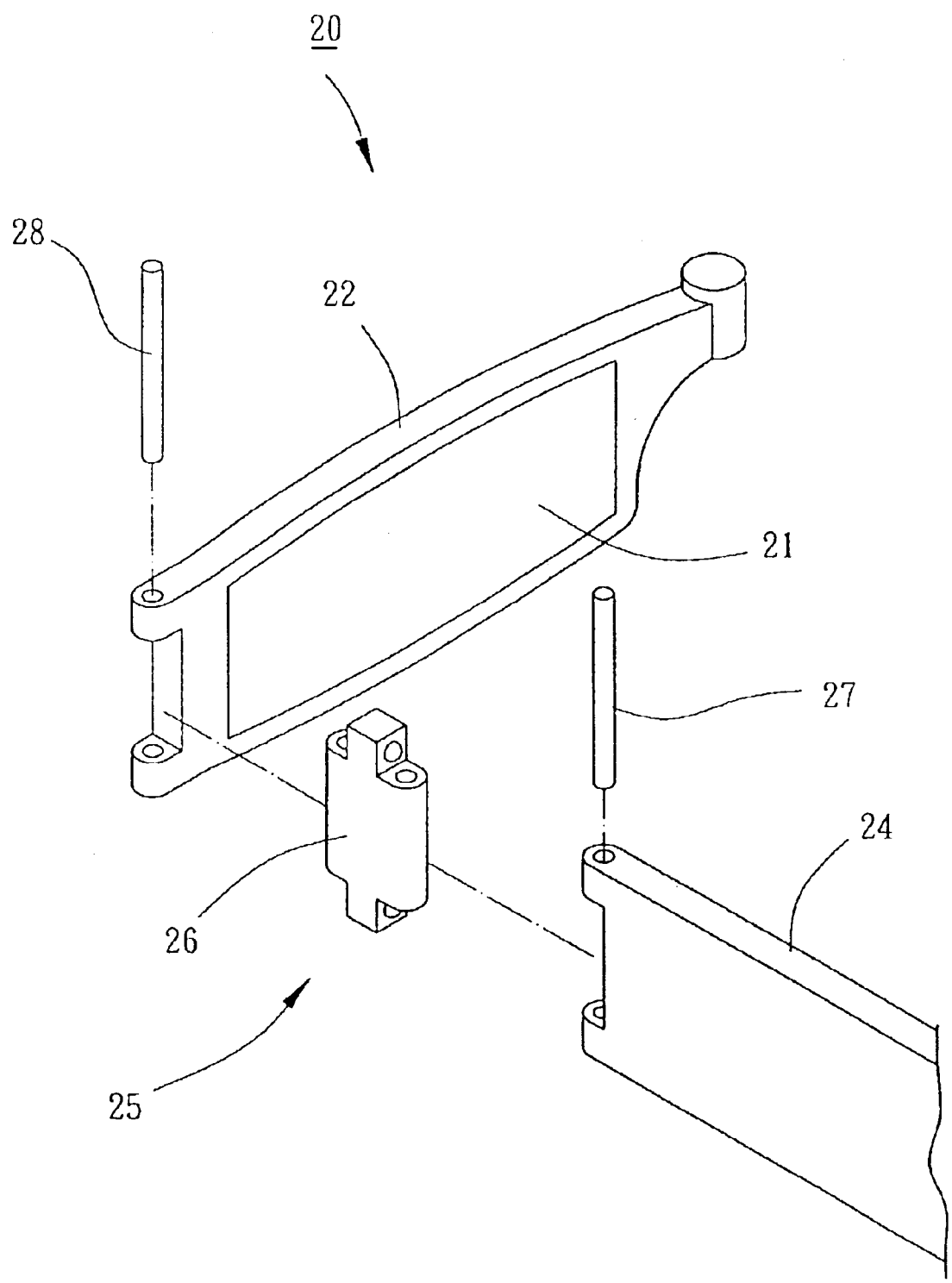

FIGS. 6–7 illustrate the second embodiment of the present invention. The foldable glasses 20 include two lenses 21, two rims 22 and two temples 23. Each temple 23 has a front section 24 pivoted on the rim 23 respectively by a pivoting mechanism 25. Each pivoting mechanism 25 has a base member 26, a first hinge 27 and a second hinge 28. Each temple 23 is pivoted on a base member 26 by a first hinge 27, and each base member 26 is pivoted on a rim 22 by a second hinge 18. Orientations of the first hinges 27 are substantially parallel to the orientations of the second hinges 28. Based on the disclosed structure, the first hinges 27 allow the temples 24 to be rotated from perpendicular to parallel to the lenses 21. And, the second hinges 28 allow the temples 24 to be rotated about 180 degrees from being extended rearwards to being extended forwards of the lenses. Other structures that can provide similar movement of the temples 24 are within the scope of the present invention.

Figure 8:
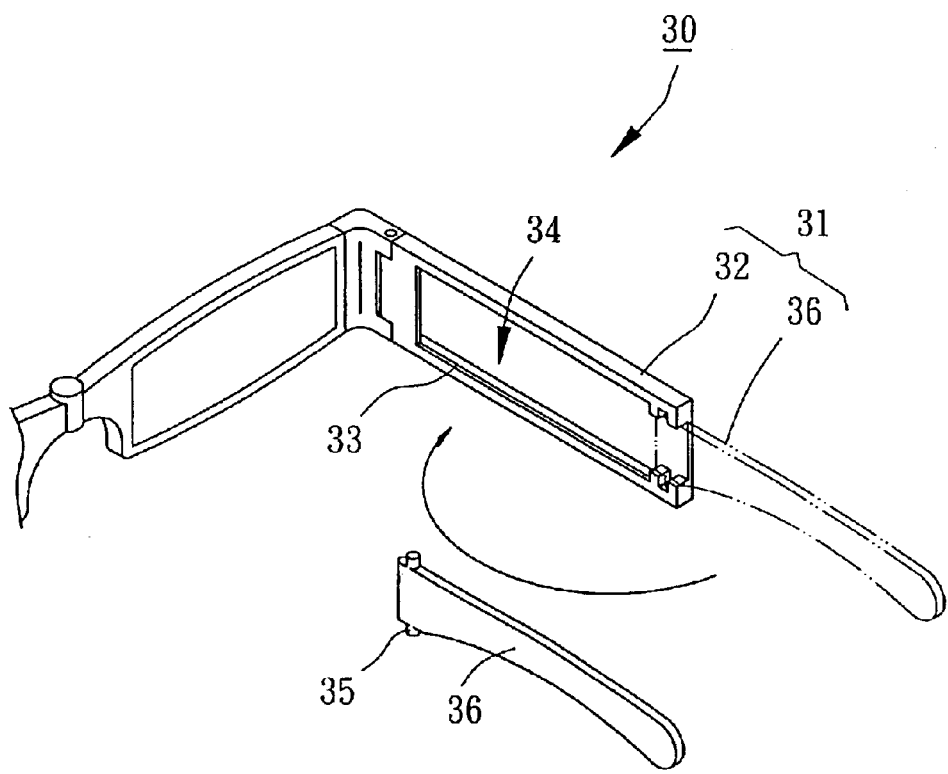
FIG. 8 is a perspective view of a third embodiment of the present invention.

FIG. 8 shows foldable glasses 30 of the third embodiment of the present invention. In this embodiment, each temple 31 has a front section 32 and a second section 36. The front section 32 can be in a rectangular tube-like structure, with a chamber 34 therein and an opening 33 at an interior side thereof. The second section 36 can be pivoted on the first section 32 by a pin 35 so that the second section 36 can be folded inwards and received in the chamber 34 via the opening 33.

Figure 9:
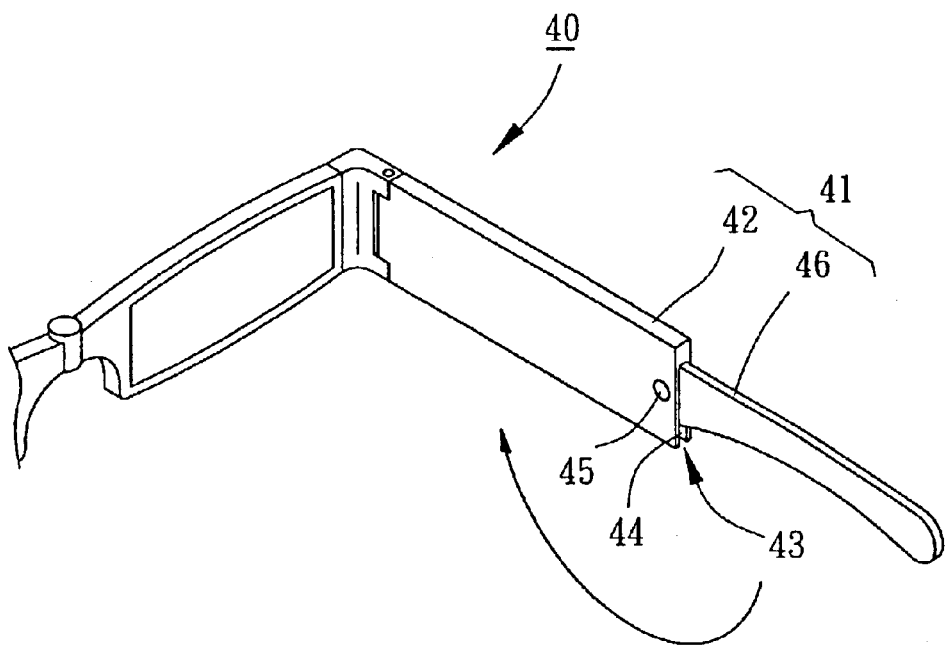
FIG. 9 is a perspective view of a fourth embodiment of the present invention.

FIG. 9 shows foldable glasses 40 of the fourth embodiment of the present invention. In this embodiment, each temple 41 has a front section 42 and a second section 46. The front section can have a rectangular tube-like structure, with a chamber 44 therein and an opening 43 at a bottom side thereof. The second section 46 can be pivoted on the first section 42 by a pin 45 so that the second section 46 can be folded downwards and received in the chamber 44 via the opening 43.

Figure 10:
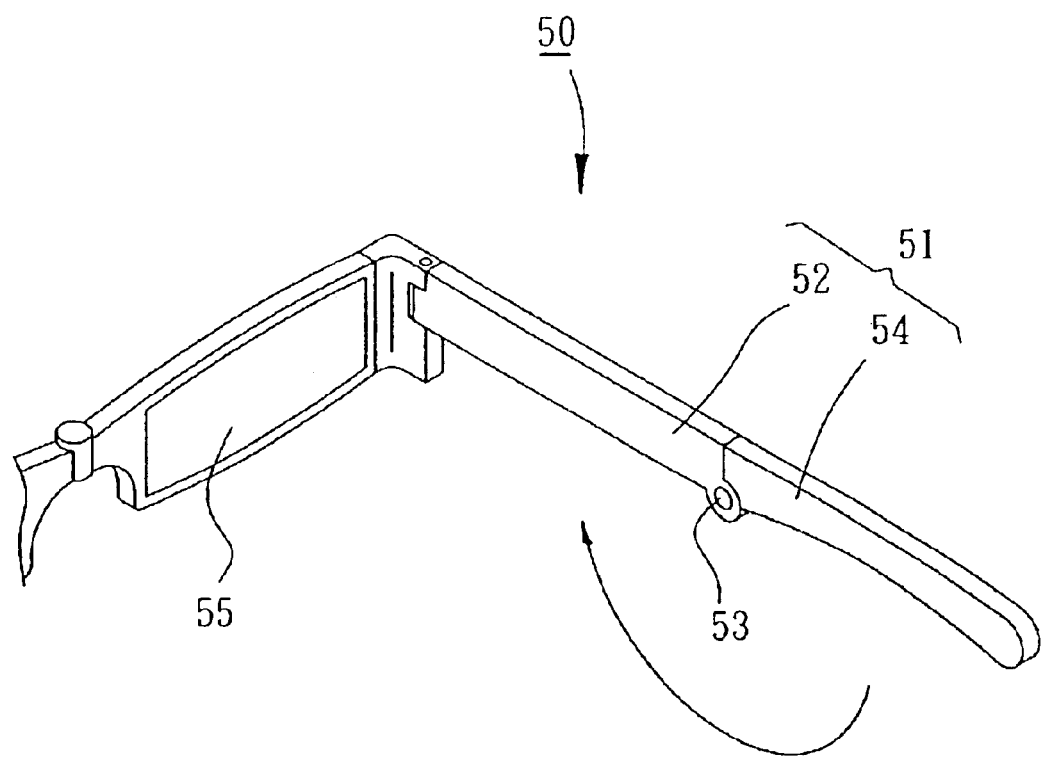
FIGS. 10–11 are different perspective views of a fifth embodiment of the present invention in a number of configurations.
Figure 11:
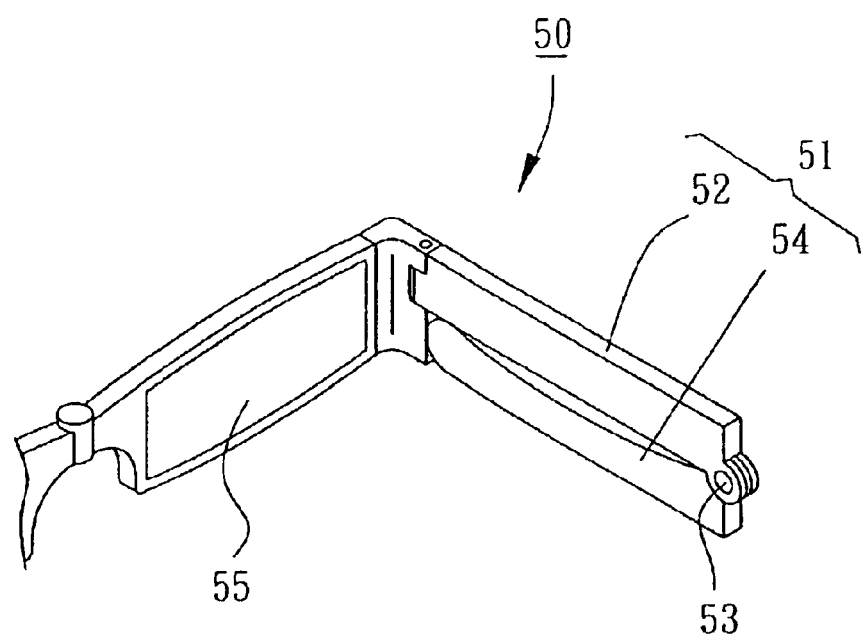
Figure 12:
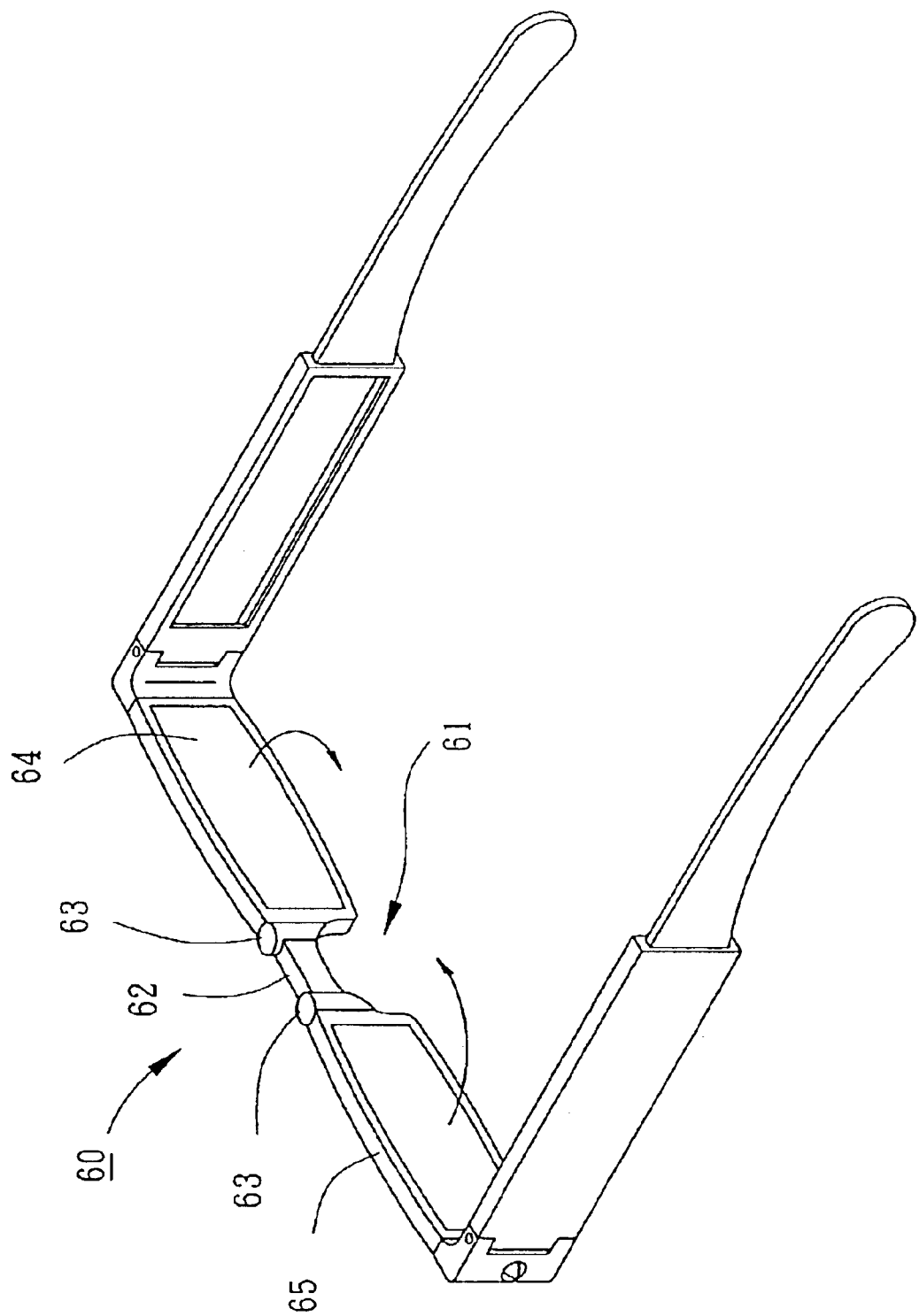
FIG. 12 is a perspective view of a sixth embodiment of the present invention.

FIG. 10 shows foldable glasses 50 of the fifth embodiment of the present invention. In this embodiment, each temple 51 has a front section 52 and a second section 54. The second section 54 is pivoted on the first section 52 by a pin 53 so that the second section 46 can be folded downwards and alongside the first section 52 at a bottom side thereof as shown in FIG. 11. The total heights of the folded temple 51, as shown in FIG. 11, can be substantially the same as the height of the lens 55 so that the temple 51 can shelter the lens 55 when the glasses 50 are folded.

Different structures are applicable to fold the front and rear sections or retract the rear section into the front section of the temples, and such structures should be within the scope of the present invention.

The sixth embodiment of the present invention provides foldable glasses 60 with an alternative folding mechanism 61. The folding mechanism provides a bridge 62 with two hinges 63 to pivot two rims 65 where lenses 64 are attached.

Figure 13:
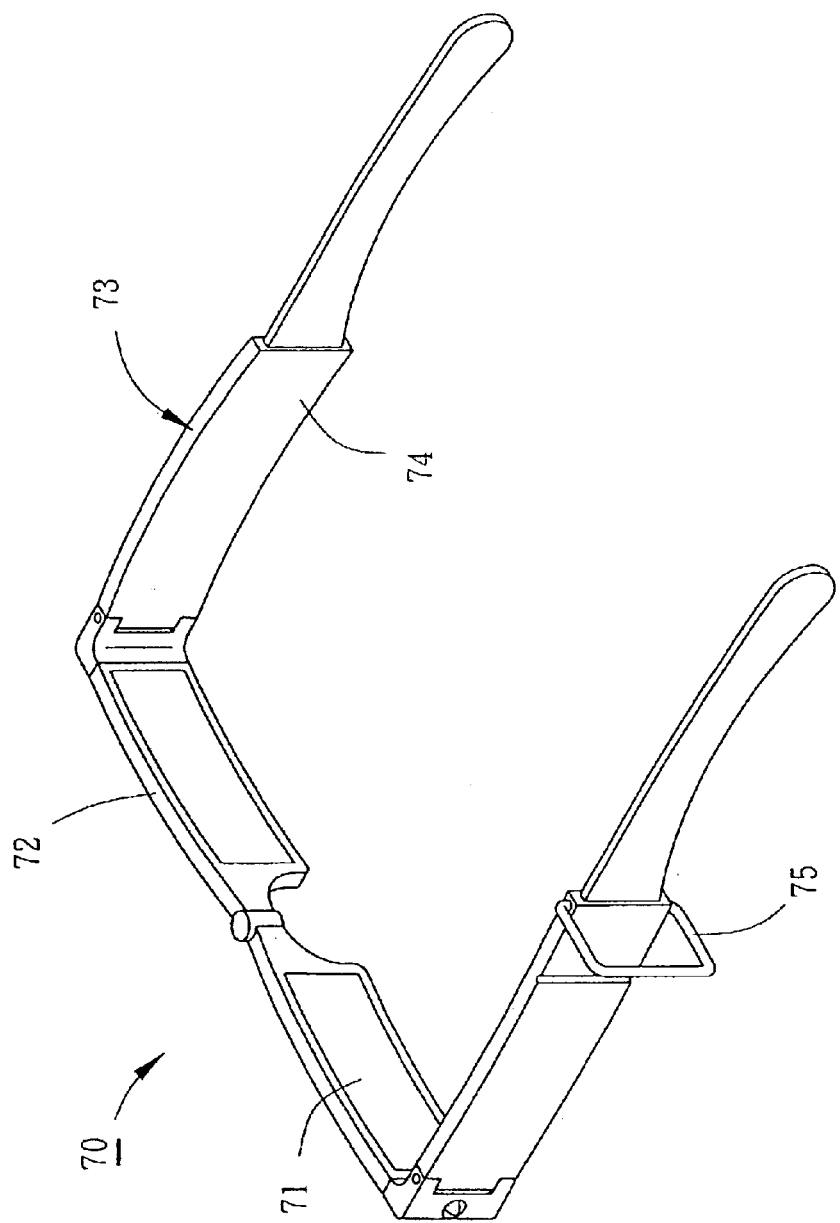
FIGS. 13–14 are different perspective views of a seventh embodiment of the present invention in a number of configurations.
Figure 14:
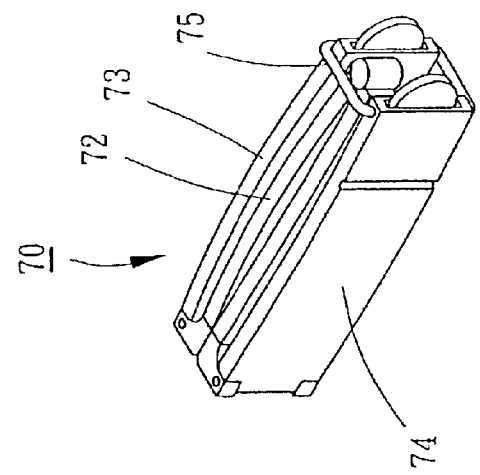

Foldable glasses 70 of the seventh embodiment of the present invention include two curved lenses 71, two rims 72 and two temples 73 as shown in FIG. 13 and FIG. 14. The temples 73 are also curved to conform to the shape of the user's head. Such glasses 70 meet the requirements of ergonomics. The foldable glasses 70 can reach a more optimal space that conventional curved foldable glasses have difficulty reaching. The glasses 70 further provide a ring 75 at a front section 74 of one of the temples 73 to hook onto the other temple 73 when the glasses 70 are folded. The ring 75 further prevents the folded glasses 70 from being unfolded unexpectedly.

Different embodiments of the invention can be combined. For example, the ring 75 shown in FIG. 13 can be applied to the embodiment shown in FIG. 1. Also, other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A pair of foldable glasses, comprising:
    two lenses having a first side and a second side respectively wherein said first sides face human eyes and said second sides are sides opposite from said first sides;
    folding means for connecting said lenses together and folding said lenses with said first sides thereof facing each other;
    two temples provided on said lenses at outer sides thereof and extended rearwards, each of which has a front section and a rear section connected with said front section in a foldable or retractable way; and
    two pivoting means for connecting said two temples and said two lenses respectively so that said temples can be turned between positions of said temples substantially perpendicular and substantially parallel to said lenses and can be turned between positions of said temples extended rearward and forward from said lenses;
    wherein to fold the glasses, each of the temples is rotated from being extended rearward to extended forward from the lenses.

2. The foldable glasses as defined in claim 1, wherein said folding means comprises a hinge pivoting said lenses.

3. The foldable glasses as defined in claim 1, wherein said folding means comprises a bridge and two hinges at said bridge pivoting said lenses respectively.

4. The foldable glasses as defined in claim 1, further comprising two rims to which said lenses are respectively attached, wherein said folding means and said pivoting means are connected with said lenses via said rims.

5. The foldable glasses as defined in claim 1, wherein said pivoting means each comprises a base member, a first hinge pivoting said front section of said temple on said base member and a second hinge pivoting said base member on said lenses whereby said front section of said temple can be turned between positions of said front section substantially perpendicular and substantially parallel to said lenses along said first hinge and can be turned between positions of said temple extended rearward and forward from said lenses along said second hinge.

6. The foldable glasses as defined in claim 5, wherein orientation of said first hinge is substantially parallel to orientation of said second hinge.

7. The foldable glasses as defined in claim 5, wherein orientation of said first hinge is substantially perpendicular to orientation of said second hinge.

8. The foldable glasses as defined in claim 1, wherein said front section of said temple has a chamber therein and an opening at a rear side thereof and said rear section is slidably received in said chamber.

9. The foldable glasses as defined in claim 1, wherein said front section of said temple has a chamber therein and an opening at an interior side thereof and said rear section is pivoted on said front section with a pin to be turned inwardly and received in said chamber via said opening.

10. The foldable glasses as defined in claim 1, wherein said front section of said temple has a chamber therein and an opening at a bottom side thereof and said rear section is pivoted on said front section with a pin to be turned downwardly and received in said chamber via said opening.

11. The foldable glasses as defined in claim 1, wherein said rear section is pivoted on said front section with a pin to be turned such that said rear section is alongside said front section when the rear section is pivoted.

12. The foldable glasses as defined in claim 1, wherein a height of said temple after said front section and said rear section folded or retracted is substantially equal to heights of said lenses.

13. The foldable glasses as defined in claim 1, further comprising a ring provided on one of said temple to hook another temple when the glasses have been folded.

14. A pair of foldable glasses, comprising:

two lenses, each having a first side and a second side that is opposite to the first side;

a folding mechanism being configured to couple said lenses together; and two temples, each coupled to one lens through a pivoting joint, and each temple being able to be extended or shortened;

wherein each pivoting joint is configured to allow its corresponding temple to be rotated from being substantially perpendicular to being substantially parallel to the lenses, and to be rotated from being extended rearward to being extended forward from the lenses;

when the glasses are worn by a user, the first sides of the lenses face the eyes of the user, the temples extend rearward from the lenses, and the temples are in their extended configurations;

to fold the glasses, each of the temples is rotated from being extended rearward to extended forward from the lenses; and when the glasses are folded, the first sides of the lenses are facing each other, the temples are substantially parallel to the lenses, and the temples are in their shortened configurations.

* * * * *